US012222088B1

(12) United States Patent
He

(10) Patent No.: US 12,222,088 B1
(45) Date of Patent: Feb. 11, 2025

(54) PIN LIGHTING LAMP WITH PIN PROTECTION

(71) Applicant: Shiting He, Zhumadian (CN)

(72) Inventor: Shiting He, Zhumadian (CN)

( * ) Notice: Subject to any disclaimer, the term of this patent is extended or adjusted under 35 U.S.C. 154(b) by 0 days.

(21) Appl. No.: 18/397,021

(22) Filed: Dec. 27, 2023

(51) Int. Cl.
*F21V 15/01* (2006.01)
*F21V 19/00* (2006.01)

(52) U.S. Cl.
CPC .......... *F21V 15/01* (2013.01); *F21V 19/0005* (2013.01)

(58) Field of Classification Search
CPC ............................ F21V 15/01; F21V 19/0005
See application file for complete search history.

(56) References Cited

U.S. PATENT DOCUMENTS 4,985,001 A * 1/1991 Nagai ...................... F21S 4/10 439/527
5,829,867 A * 11/1998 Baczek ................ F21V 29/503 362/264
6,319,056 B1 * 11/2001 Schunk ................. H01R 33/46 439/505

* cited by examiner

*Primary Examiner* — Karabi Guharay
(74) *Attorney, Agent, or Firm* — Birchwood IP

(57) ABSTRACT

The present disclosure provides a PIN illumination lamp with pin protection, including a lamp head assembly, a luminous assembly, a first wire, and a second wire. The first wire is configured to connect the second wire to a power source and parallel multiple second wires. A connection position between the first wire and the second wire is covered with an insulation rubber, the second wire is electrically connected to the lamp head assembly. The luminous assembly is installed in the lamp head assembly and electrically connected to the lamp head assembly. This PIN lighting lamp with pin protection adds a shell on a conductive needle, which can keep the conductive needle working for a long time without deformation and protect an integrated lampwick, thereby reducing external pollution to the integrated lampwick and improving its practical life.

11 Claims, 8 Drawing Sheets

PIN LIGHTING LAMP WITH PIN PROTECTION

TECHNICAL FIELD

The present disclosure relates to the field of light bulb application technologies, and in particular, to a PIN lighting with pin protection.

BACKGROUND

A light bulb refers to an illumination source that emits light and heat through electrical energy. With the development of society, an application of the light bulb has also undergone different changes. Initially, it may have been for a convenience of production and life, but with the progress of society, there have been significant changes in a use of light bulb, including functional lights for different purposes such as cars, beautifying an environment, and decoration.

The existing light bulbs expose the lampwick inside a lampshade and lack an application of setting a shell on a conductive pin. The conductive pin is prone to deformation after long-term operation. To this end, a PIN lighting with pin protection is proposed.

SUMMARY

A purpose of the present disclosure is to provide a PIN illumination lamp with pin protection to solve the problems proposed in the background technology.

To achieve the above purpose, the present disclosure provides the following technical solution:

- a PIN lighting lamp with pin protection, including a lamp head assembly, a luminous assembly, a first wire, and a second wire; the first wire is configured to connect the second wire to a power source and to parallel multiple second wires; a connection position between the first wire and the second wire is covered with an insulation rubber, the second wire is electrically connected to the lamp head assembly, and the luminous assembly is installed in the lamp head assembly and electrically connected to the lamp head assembly.

In an embodiment of the present disclosure, the lamp head assembly includes a first shell and a fix block, the fix block is fixed at a top of an inner side of the first shell, and the fix block is fixedly provided with a metal conductive hole, the second wire runs through a top of the first shell and is electrically connected to a top of the metal conductive hole, the metal conductive hole is configured to provide power to the luminous assembly.

In an embodiment of the present disclosure, the luminous assembly includes a second shell, a third shell, an integrated lampwick, a support column, and a conductive pin; two support columns are fixed on the second shell, and the conductive pin runs through the support column, the integrated lampwick is provided at an end of the support column; one end of the conductive pin is fixed to the integrated lampwick, and the other end thereof extends through the support column and to an interior of the second shell, the conductive pin is inserted into the metal conductive hole and electrically connected to the metal conductive hole, the third shell is located on an outer side of the integrated lampwick and is clamped to the second shell.

In an embodiment of the present disclosure, both the second shell and the third shell are made of a colorless transparent material.

In an embodiment of the present disclosure, an outer side of the third shell is fixed with a colorless transparent light guide column, and an end of the colorless transparent light guide column is provided with a conical groove.

In an embodiment of the present disclosure, an edge of the metal conductive hole is provided with a chamfer.

In an embodiment of the present disclosure, the PIN lighting lamp with pin protection further includes a transparent lampshade configured to protect the luminous assembly, an end of the transparent lampshade is provided with an external thread, the inner side of the first shell is provided with an internal thread, and the transparent lampshade is threaded to the first shell.

In an embodiment of the present disclosure, the PIN lighting lamp with pin protection further includes a fourth shell, where the fourth shell is fixed at an end of the first shell, and the fourth shell is an integrated structure with the first shell.

In an embodiment of the present disclosure, an outer side of the first shell is provided with an anti-slip protrusion.

In an embodiment of the present disclosure, the insulation rubber is fixed with a connection block, the connection block is provided with a hole.

In an embodiment of the present disclosure, the PIN lighting lamp with pin protection further includes a connector for electrically connecting the first wire and the second wire, where the connector includes an upper shell, a lower shell, and a conductive needle, where the upper shell and the lower shell are clamped through a clamping portion provided on them, a wire groove is provided between the upper shell and the lower shell for placing the first wire and the second wire, the insulation rubber is wrapped on an outer side of the upper shell and the lower shell, and the conductive needle is provided with two; one conductive needle fixes a live wire on the first wire and the second wire, and the other conductive needle fixes a zero wire on the first wire and the second wire, and the conductive needle is inserted and fixed on the upper shell and the lower shell.

In an embodiment of the present disclosure, an edge of an end of the second shell is provided with a hook; and end of the third shell is provided with a clamping hole; the second shell and the third shell are clamped in the clamping hole through the hook to achieve clamping.

Compared with prior art, the beneficial effects of the present disclosure are:

The present disclosure adds a shell on the conductive needle, which can maintain the conductive needle working for a long time without deformation, and plays a protective role in the integrated lampwick, thereby reducing external pollution to the integrated lampwick, and improving a practical life of the integrated lampwick.

Numeral reference: 1. Lamp head assembly; 2—Luminous assembly; 3—First wire; 4—Second wire; 5—Insulation rubber; 6—First shell; 7—Fix block; 8—Metal conductive hole; 9—Second shell; 10—Third shell; 11—Integrated lampwick; 12—Support column; 13—Conductive pin; 14—Colorless transparent light guide column; 15—Conical groove; 16—Chamfer; 17—Transparent lampshade; 18—External thread; 19—Internal thread; 20—Fourth shell; 21—Anti-slip protrusion; 22—Connection block; 23—Hole; 24—Lower shell; 25—Conductive needle; 26—Wire groove; 27—Hook; 28—Clamping hole.

DESCRIPTION OF EMBODIMENTS

The following will provide a clear and complete description of the technical solution in the embodiments of the present disclosure, in combination with the drawings. Obviously, the described embodiments are only a part of the embodiments of the present disclosure, not all of them. Based on the embodiments in the present disclosure, all other embodiments obtained by ordinary technicians in the art without creative work fall within the protection scope of the present disclosure.

Figure 1:
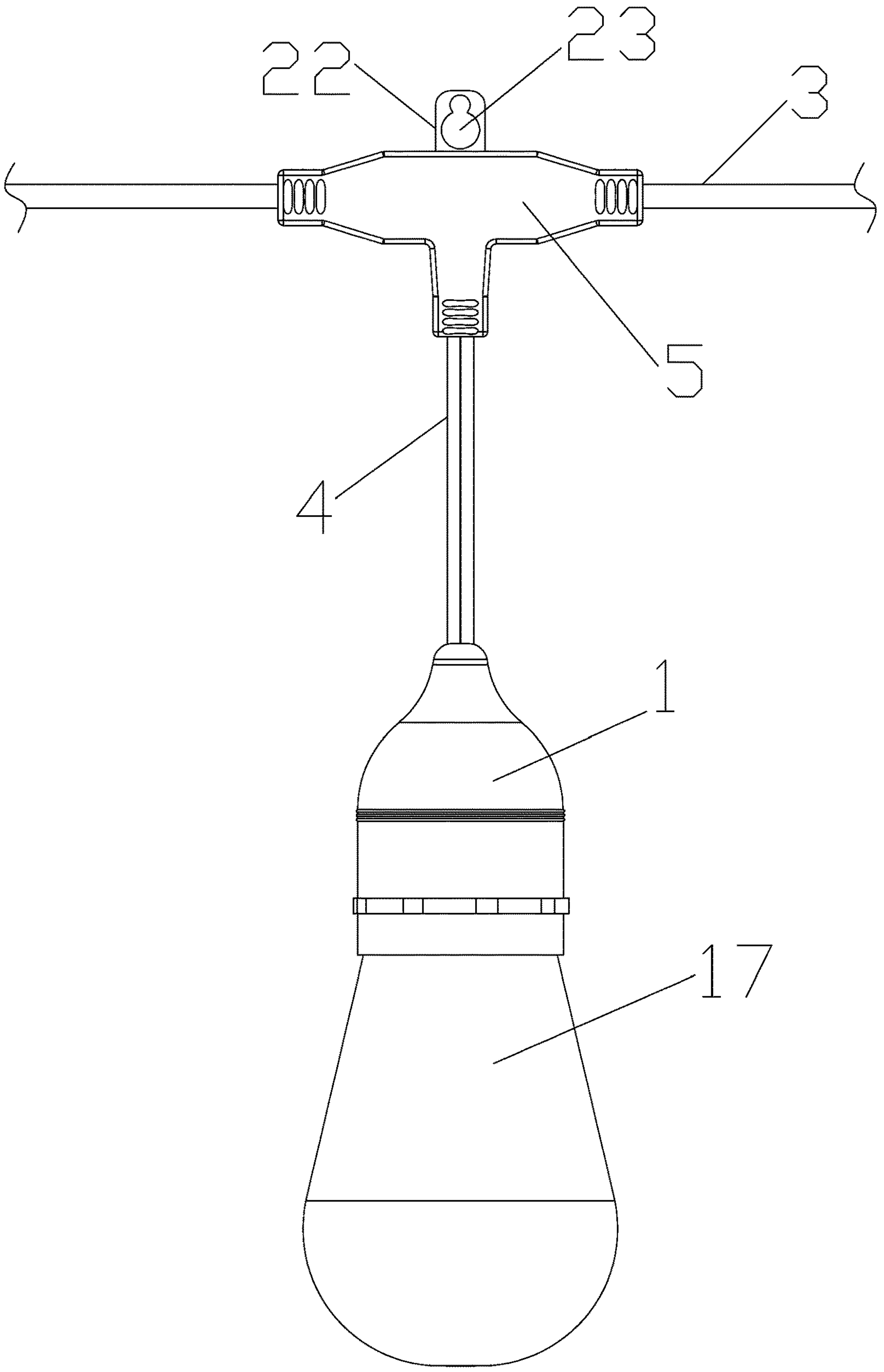
FIG. 1 is a schematic diagram of an overall structure of the present disclosure.
Figure 2:
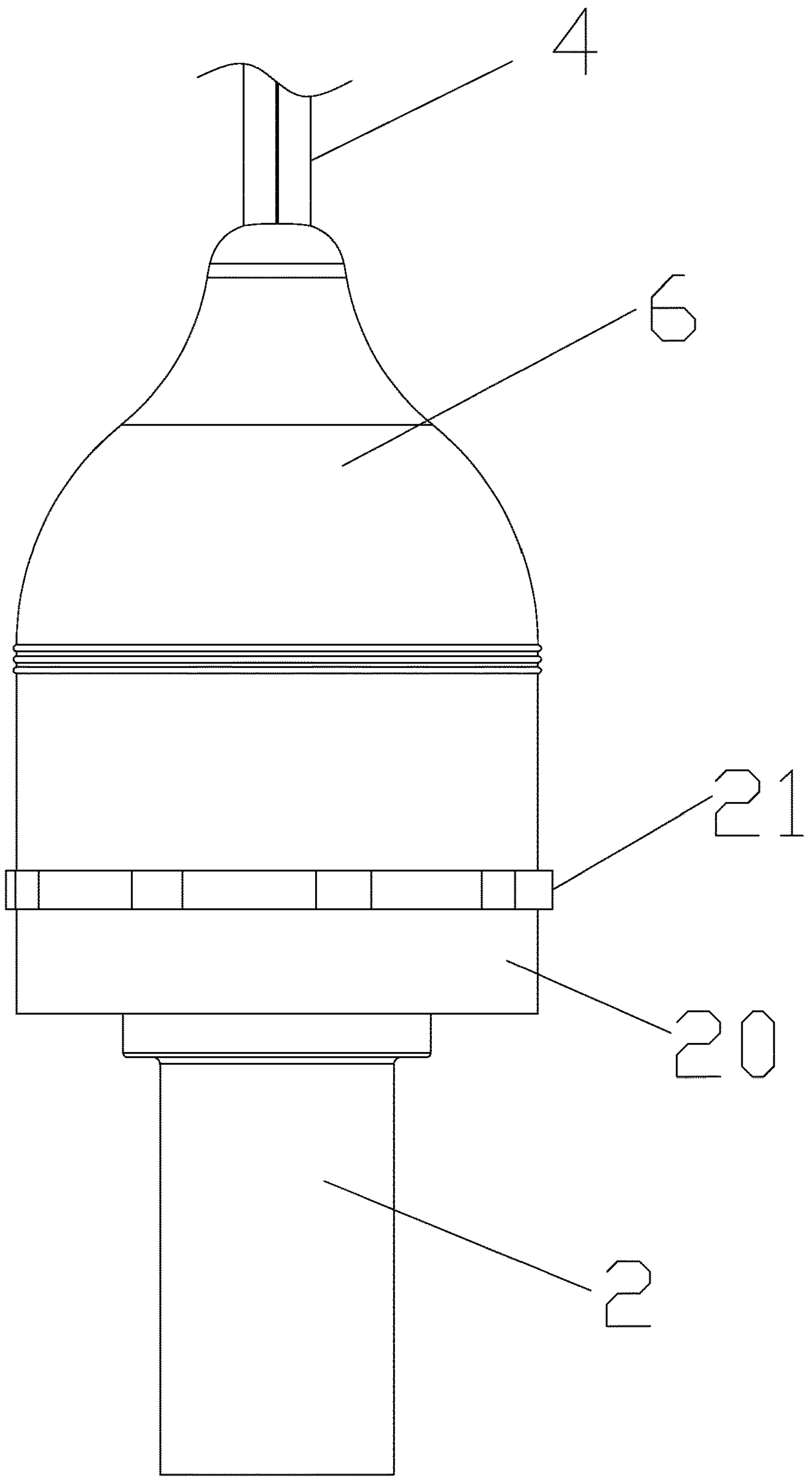
FIG. 2 is a schematic diagram of a structure of a lamp head assembly of the present disclosure.
Figure 3:
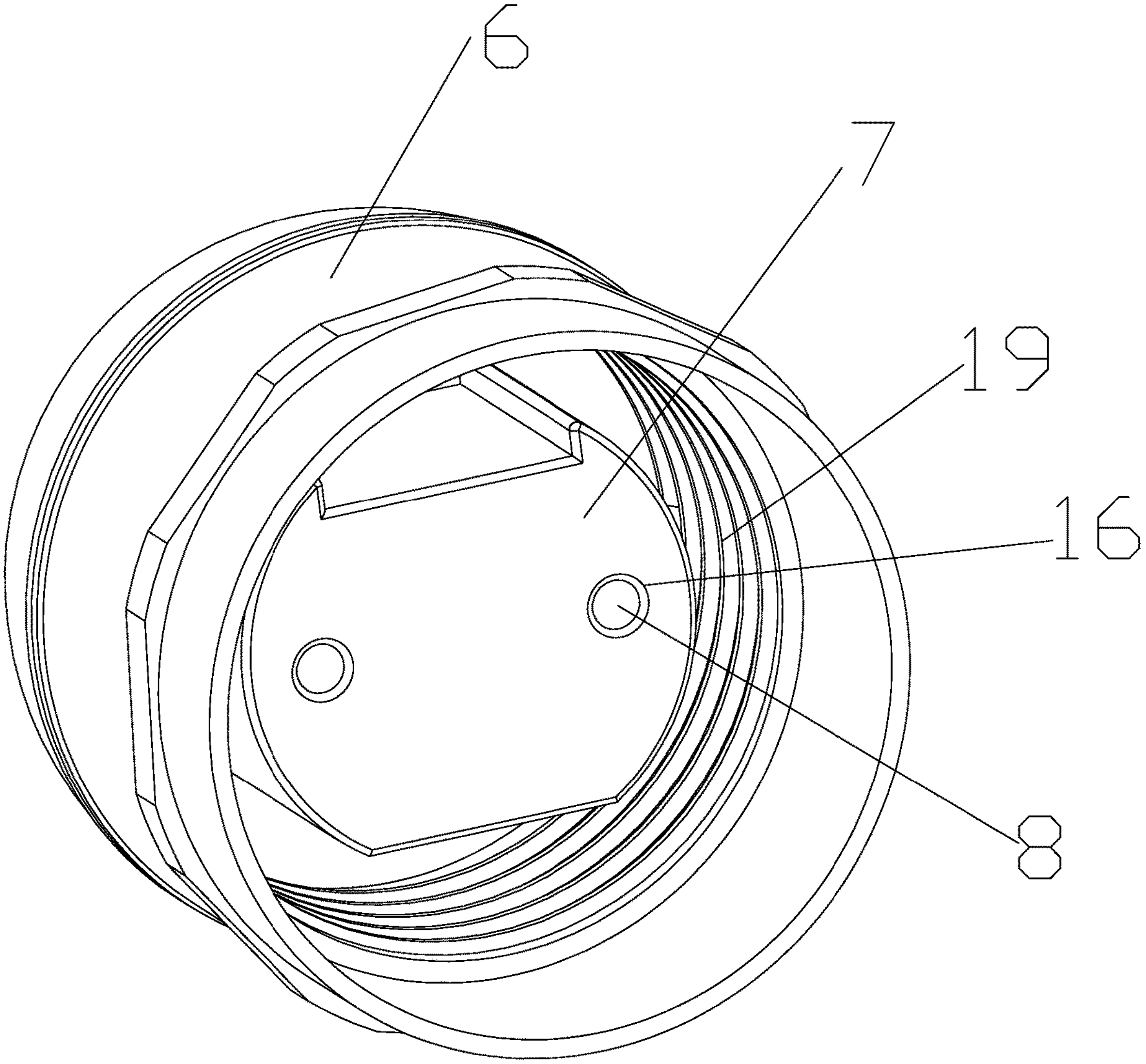
FIG. 3 is a schematic diagram of a structure of a metal conductive hole of the present disclosure.
Figure 4:
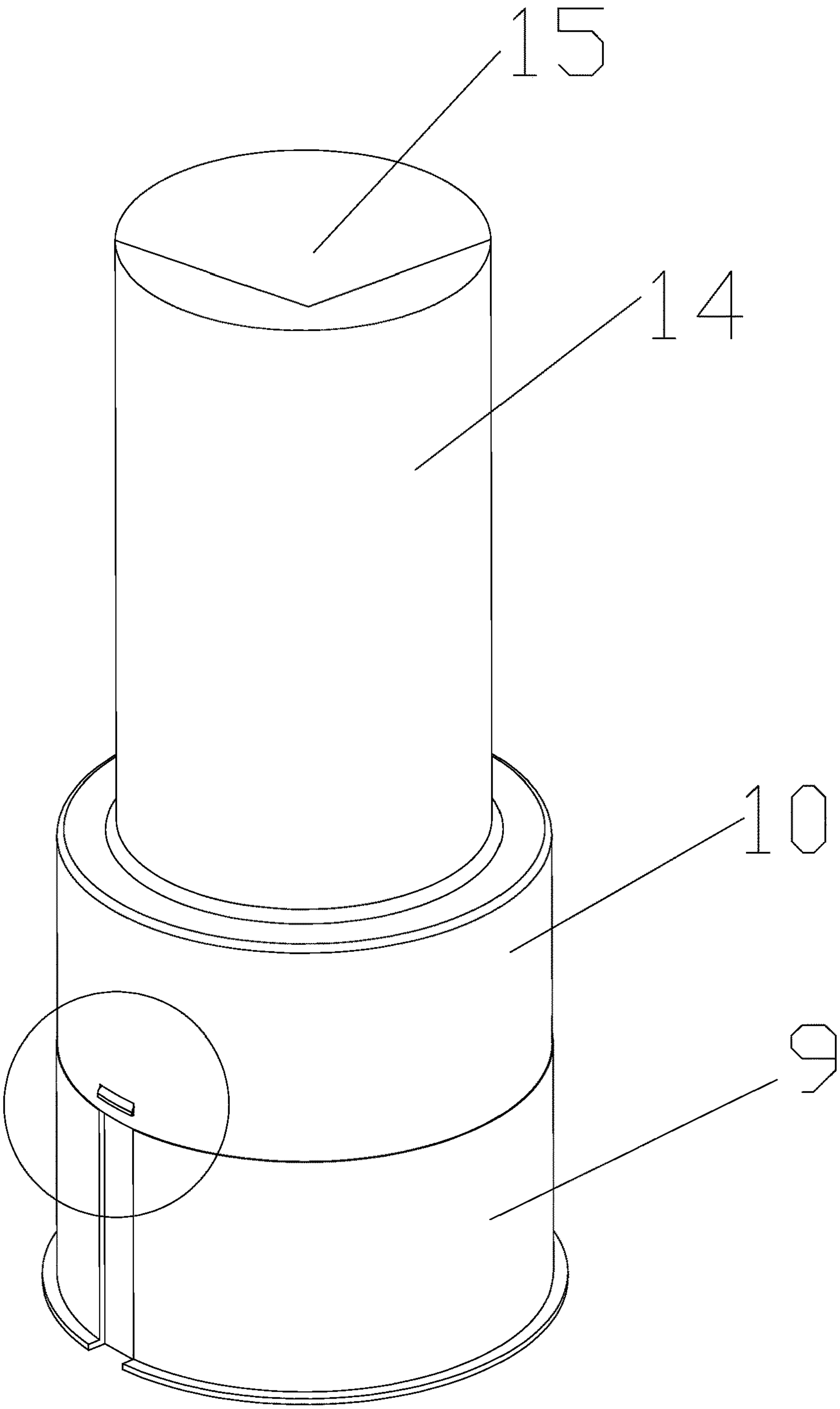
FIG. 4 is a schematic diagram of a structure of a luminous assembly of the present disclosure.
Figure 5:
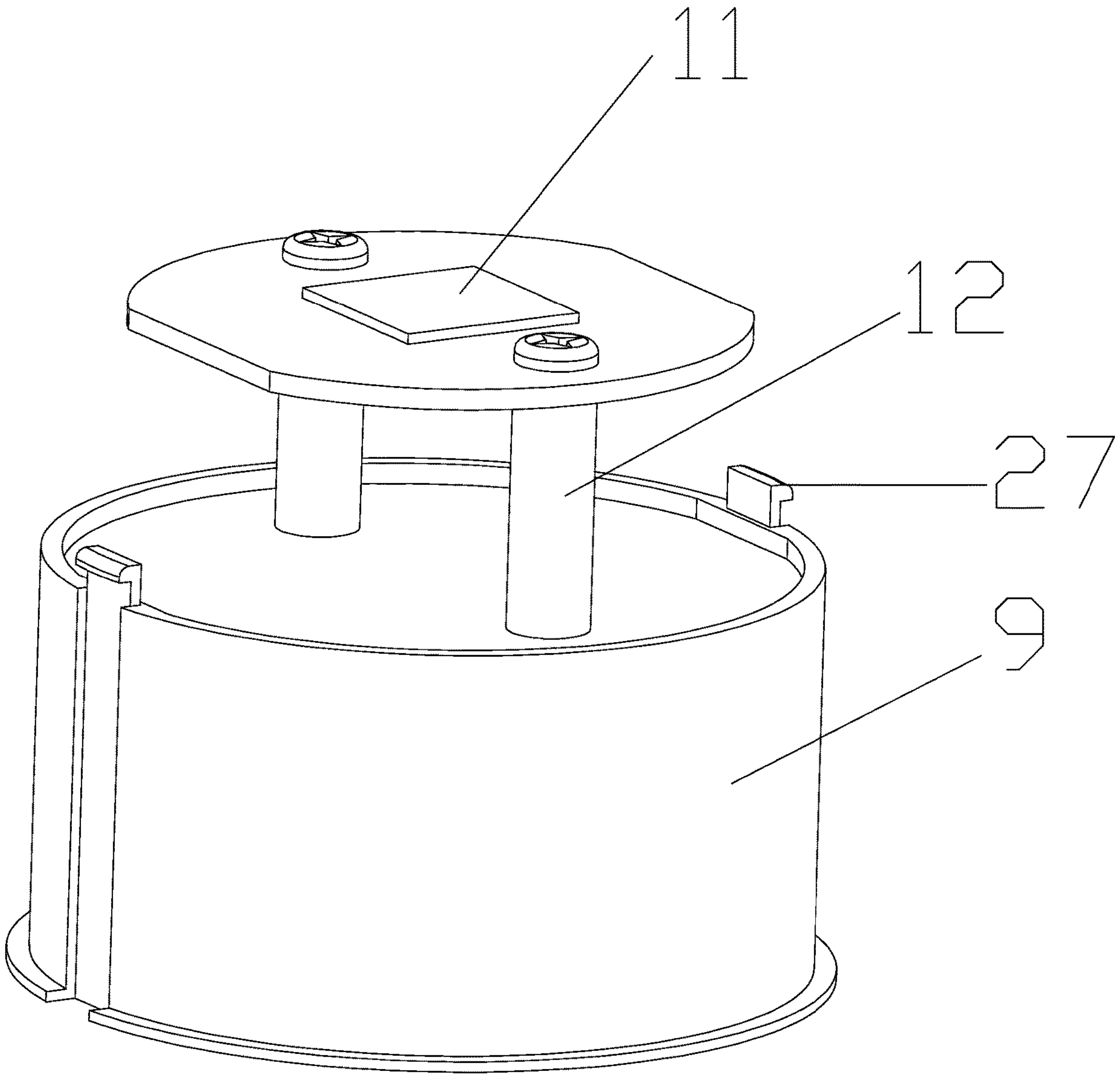
FIG. 5 is a schematic diagram of a structure of a second shell of the present disclosure.
Figure 6:
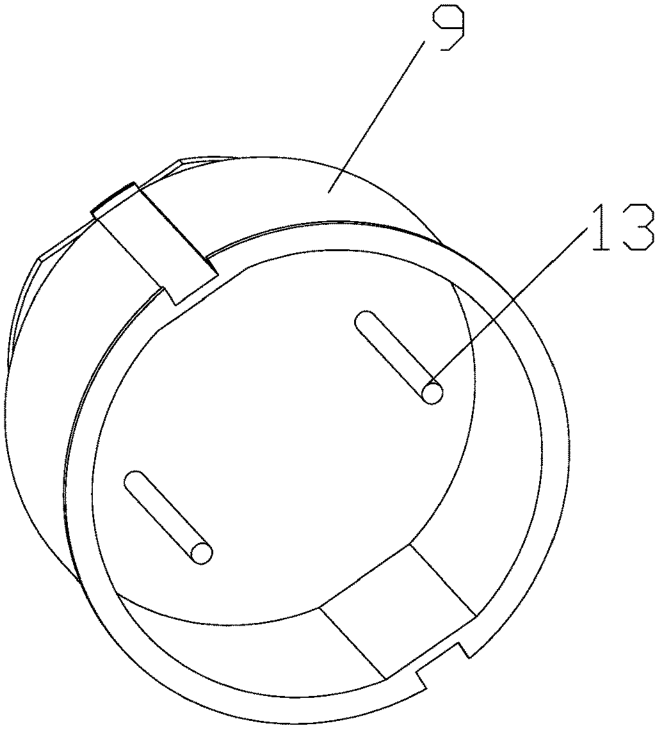
FIG. 6 is a schematic diagram of a structure of a conductive pin of the present disclosure.
Figure 7:
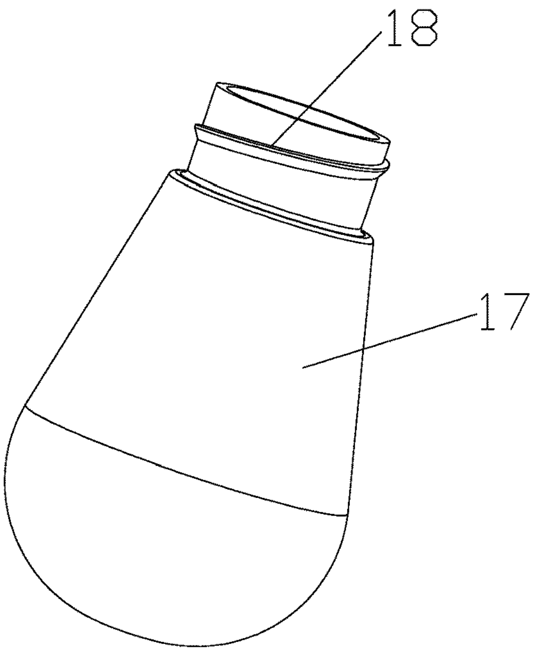
FIG. 7 is a schematic diagram of a structure of a transparent lampshade of the present disclosure.
Figure 8:
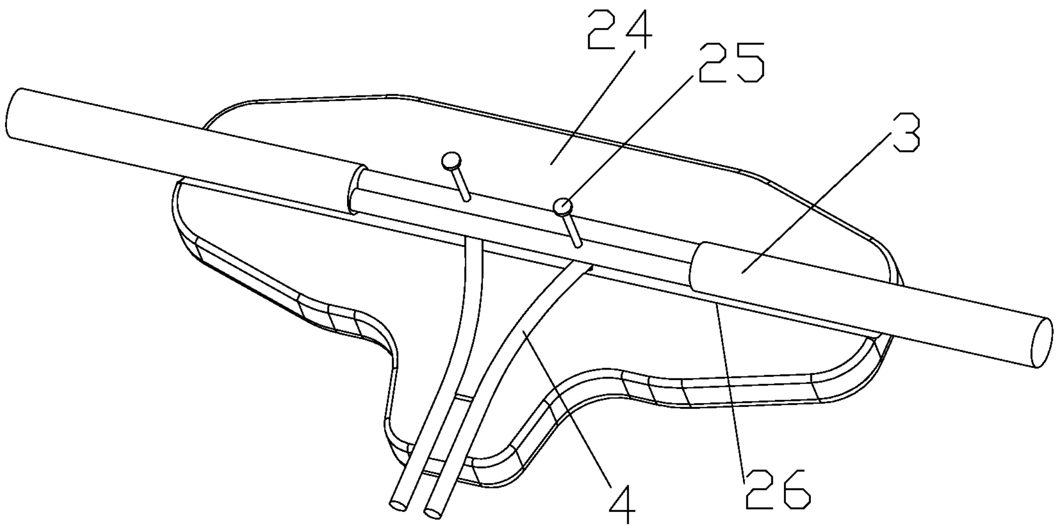
FIG. 8 is a schematic diagram of a structure of a connector of the present disclosure.
Figure 9:
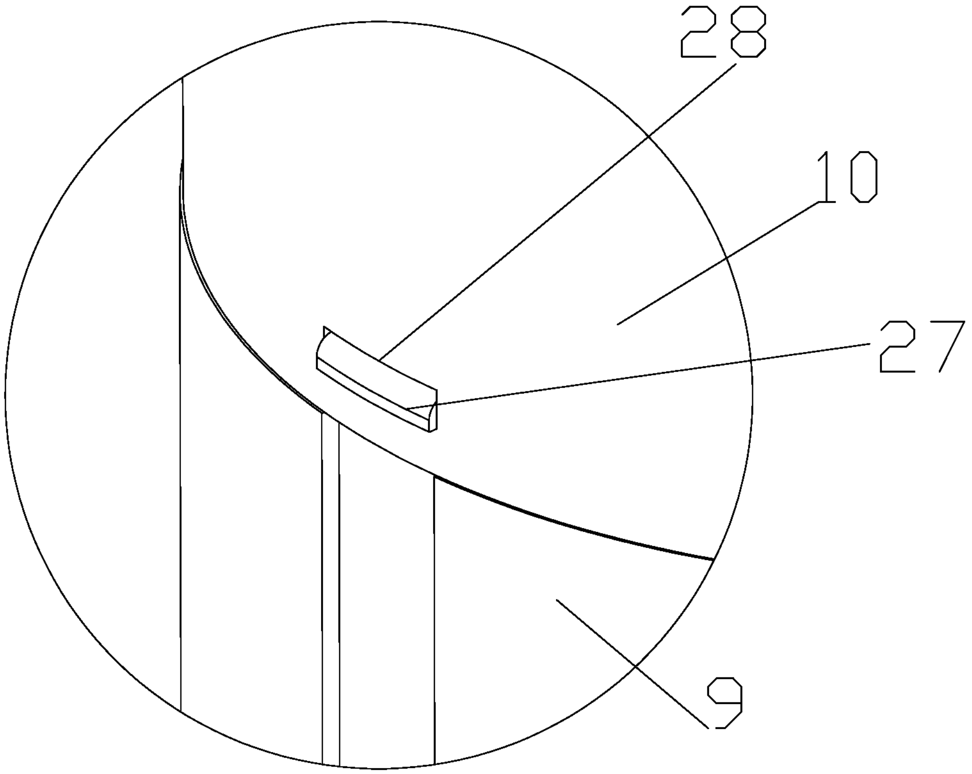
FIG. 9 is a schematic diagram of a structure of a buckle of the present disclosure.
Figure 10:
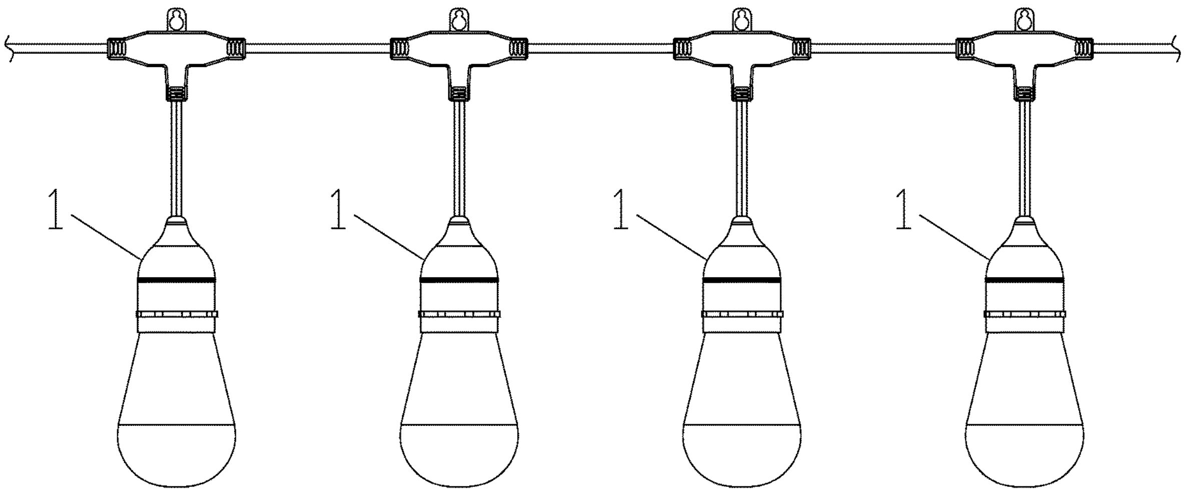
FIG. 10 is a schematic diagram of a parallel structure of multiple lamp head assemblies of the present disclosure.

Please refer to FIGS. 1-10. The present disclosure provides a technical solution: a PIN lighting lamp with pin protection, including a lamp head assembly 1, a luminous assembly 2, a first wire 3, and a second wire 4. The first wire 3 is configured to connect the second wire 4 to a power supply and is configured to parallel multiple second wires 4. A connection position between the first wire 3 and the second wire 4 is covered with an insulation rubber 5, the second wire 4 is electrically connected to the lamp head assembly 1, the luminous assembly 2 is installed in the lamp head assembly 1 and electrically connected to the lamp head assembly 1. During production, multiple first wires 3 can be connected in parallel on the first wire 3 according to an actual usage need, that is, multiple light bulbs can be used in parallel.

The lamp head assembly 1 includes a first shell 6 and a fix block 7, the fix block 7 is fixed at a top of an inner side of the first shell 6, and the fix block 7 is fixedly provided with a metal conductive hole 8. The second wire 4 runs through a top of the first shell 6 and is electrically connected to a top of the metal conductive hole 8. The metal conductive hole 8 is configured to provide power to the luminous assembly 2.

The luminous assembly 2 includes a second shell 9, a third shell 10, an integrated lampwick 11, a support column 12, and a conductive pin 13. Two support columns 12 are fixed on the second shell 9, the conductive pin 13 runs through the support column 12. The integrated lampwick 11 is provided at an end of the support column 12, and one end of the conductive pin 13 is fixed to the integrated lampwick 11, and the other end thereof extends through the support column 12 and to an interior of the second shell 9, the conductive pin 13 is inserted into the metal conductive hole and electrically connected to the metal conductive hole. The third shell 10 is located on an outer side of the integrated lampwick 11 and is clamped to the second shell 9.

The conductive pin 13 is supported by the second shell 9 and the support column 12, thereby avoiding deformation of the conductive pin 13. The second shell 9 and the third shell 10 are clamped and wrapped on the outer side of the integrated lampwick 11, which provides protection for the integrated lampwick 11.

The second shell 9 and the third shell 10 are both made of a colorless transparent material, thereby reducing an impact on a brightness of the lampwick.

An outer side of the third shell 10 is fixed with a colorless transparent light guide column 14, and an end of the colorless transparent light guide column 14 is provided with a conical groove 15, which improves the brightness of the light bulb.

An edge of the metal conductive hole is provided with a chamfer 16, which facilitates an insertion of the conductive pin 13 into the metal conductive hole.

The PIN lighting lamp with pin protection further includes a transparent lampshade 17 configured to protect the luminous assembly 2. An end of the transparent lampshade 17 is provided with an external thread 18, the inner side of the first shell 6 is provided with an internal thread 19. The transparent lampshade 17 is threaded to the first shell 6, which provides protection for the luminous assembly 2 and further improves a service life of the integrated lampwick 11.

The PIN lighting lamp with pin protection further includes a fourth shell 20, which is fixed at an end of the first shell 6, the fourth shell 20 is an integrated structure with the first shell 6. After the transparent lampshade 17 is tightened, the edge of the fourth shell 20 contacts an outer wall of the transparent lampshade 17, thereby forming a sealing effect and improving the sealing of the transparent lampshade 17 to the luminous assembly 2.

An outer side of the first shell 6 is provided with anti-slip protrusion 21 for easy rotation of the first shell 6.

The insulation rubber 5 is fixed with a connection block 22, the connection block 22 is provided with a hole 23. The light bulb can be hung at a high place through the connection block 22, thereby improving a practicality of using multiple light bulbs simultaneously.

The PIN lighting lamp with pin protection further includes a connector for electrically connecting the first wire 3 and the second wire 4, the connector includes an upper shell, a lower shell 24, and a conductive needle 25. The upper shell and the lower shell 24 are clamped through a clamping portion provided on them, a wire groove 26 is provided between the upper shell and the lower shell 24 for placing the first wire 3 and the second wire 4. The insulation rubber 5 is wrapped on an outer side of the upper shell and the lower shell 24, and the conductive needle 25 is provided with two, one conductive needle 25 fixes a live wire on the first wire 3 and the second wire 4, while the other conductive needle 25 fixes a zero wire on the first wire 3 and the second wire 4. The conductive needle 25 is inserted and fixed on the upper and lower shells 24, rendering a connection between the first wire 3 and the second wire 4 more stable, with strong conductivity and waterproof sealing.

An edge of an end of the second shell 9 is provided with a hook 27, an end of the third shell 10 is provided with a clamping hole 28. The second shell 9 and the third shell 10 are clamped in the clamping hole 28 through the hook 27 to achieve clamping.

It should be noted that in this specification, relational terms such as first and second are only used to distinguish one entity or operation from another entity or operation, and do not necessarily require or imply any actual relationship or order between these entities or operations. Moreover, terms “include”, “comprise”, or any other variation thereof are intended to encompass a non-exclusive inclusion, such that a process, method, item, or device that includes a series of elements not only includes those elements, but also includes other elements that are not explicitly listed, or also includes elements inherent to such process, method, item, or device.

Although embodiments of the present disclosure have been shown and described, it can be understood by those skilled in the art that multiple changes, modifications, substitutions, and variations can be made to these embodiments without departing from the principles and spirit of the present disclosure. The scope of the present disclosure is limited by the accompanying claims and their equivalents.

What is claimed is:

1. A PIN lighting lamp with pin protection, comprising a lamp head assembly, a luminous assembly, a first wire, and a second wire;

the first wire is configured to connect the second wire to a power source and to parallel multiple second wires;

a connection position between the first wire and the second wire is covered with an insulation rubber, the second wire is electrically connected to the lamp head assembly, the luminous assembly is installed in the lamp head assembly and electrically connected to the lamp head assembly;

wherein the PIN lighting lamp with pin protection further comprises a connector for electrically connecting the first wire and the second wire, wherein the connector comprises an upper shell, a lower shell, and a conductive needle, wherein the upper shell and the lower shell are clamped through a clamping portion provided on them, a wire groove is provided between the upper shell and the lower shell for placing the first wire and the second wire, the insulation rubber is wrapped on an outer side of the upper shell and the lower shell, and the conductive needle is provided with two; one conductive needle fixes a live wire on the first wire and the second wire, and the other conductive needle fixes a zero wire on the first wire and the second wire, and the conductive needle is inserted and fixed on the upper shell and the lower shell.

2. The PIN lighting lamp with pin protection according to claim 1, wherein the lamp head assembly comprises a first shell and a fix block, the fix block is fixed at a top of an inner side of the first shell, and the fix block is fixedly provided with a metal conductive hole, the second wire runs through a top of the first shell and is electrically connected to a top of the metal conductive hole, the metal conductive hole is configured to provide power to the luminous assembly.

3. The PIN lighting lamp with pin protection according to claim 2, wherein the luminous assembly comprises a second shell, a third shell, an integrated lampwick, a support column, and a conductive pin; two support columns are fixed on the second shell, the conductive pin runs through the support column, the integrated lampwick is provided at an end of the support column; one end of the conductive pin is fixed to the integrated lampwick, and the other end thereof extends through the support column and to an interior of the second shell, the conductive pin is inserted into the metal conductive hole and electrically connected to the metal conductive hole, the third shell is located on an outer side of the integrated lampwick and is clamped to the second shell.

4. The PIN lighting lamp with pin protection according to claim 3, wherein both the second shell and the third shell are made of a colorless transparent material.

5. The PIN lighting lamp with pin protection according to claim 4, wherein an outer side of the third shell is fixed with a colorless transparent light guide column, an end of the colorless transparent light guide column is provided with a conical groove.

6. The PIN lighting lamp with pin protection according to claim 3, wherein an edge of an end of the second shell is provided with a hook; an end of the third shell is provided with a clamping hole; the second shell and the third shell are clamped in the clamping hole through the hook to achieve clamping.

7. The PIN lighting lamp with pin protection according to claim 2, wherein an edge of the metal conductive hole is provided with a chamfer.

8. The PIN lighting lamp with pin protection according to claim 1, wherein further comprising a transparent lampshade configured to protect the luminous assembly, an end of the transparent lampshade is provided with an external thread, the inner side of a first shell is provided with an internal thread, and the transparent lampshade is threaded to the first shell.

9. The PIN lighting lamp with pin protection according to claim 8, wherein further comprising a fourth shell, wherein the fourth shell is fixed at an end of the first shell, the fourth shell is an integrated structure with the first shell.

10. The PIN lighting lamp with pin protection according to claim 1, wherein an outer side of the first shell is provided with an anti-slip protrusion.

11. The PIN lighting lamp with pin protection according to claim 1, wherein the insulation rubber is fixed with a connection block, and the connection block is provided with a hole.

* * * * *